(12) United States Patent
Walker

(10) Patent No.: US 10,702,078 B1
(45) Date of Patent: Jul. 7, 2020

(54) SHELF EDGE DISPLAYS

(71) Applicant: Brian Walker, Monticello, MN (US)

(72) Inventor: Brian Walker, Monticello, MN (US)

(*) Notice: Subject to any disclaimer, the term of this patent is extended or adjusted under 35 U.S.C. 154(b) by 0 days.

(21) Appl. No.: 16/350,721

(22) Filed: Dec. 24, 2018

Related U.S. Application Data

(60) Provisional application No. 62/613,237, filed on Jan. 3, 2018.

(51) Int. Cl.
A47F 5/00 (2006.01)
A47B 96/02 (2006.01)
G02B 5/02 (2006.01)
G09F 13/04 (2006.01)
A47F 11/10 (2006.01)

(52) U.S. Cl.
CPC .......... A47F 5/0043 (2013.01); A47B 96/021 (2013.01); A47F 5/0025 (2013.01); A47F 5/0068 (2013.01); A47F 11/10 (2013.01); G02B 5/02 (2013.01); G09F 13/0413 (2013.01)

(58) Field of Classification Search
CPC ...... A47F 5/0043; A47F 5/0025; A47F 11/10; A47F 5/0068; A47B 96/02; G02B 5/02; G09F 13/0413; G09F 3/20; G09F 3/204; G09F 13/04; G09F 13/0404
USPC ............ 211/119.003; 40/649, 661, 564, 575, 40/124.02, 642.02, 642.01, 661.02, 541; D20/43, 44, 99
See application file for complete search history.

(56) References Cited

U.S. PATENT DOCUMENTS

| | | | | |
|---|---|---|---|---|
| 1,704,562 A * | 3/1929 | Egan | ......... | G09F 3/20 40/652 |
| 1,719,505 A * | 7/1929 | Egan | ......... | G09F 3/20 40/652 |
| 1,864,491 A * | 6/1932 | Hopp | ......... | G09F 3/20 40/653 |
| 2,320,463 A * | 6/1943 | Pavlovic, Jr. | ......... | G09F 3/20 40/653 |
| 2,640,288 A * | 6/1953 | Orlin | ......... | G09F 3/20 40/650 |
| 2,827,718 A * | 3/1958 | Howard | ......... | G09F 3/20 40/658 |
| 2,950,554 A * | 8/1960 | Foster | ......... | G09F 3/20 40/650 |
| 3,084,463 A * | 4/1963 | Reynolds | ......... | G09F 3/20 40/564 |
| 3,086,308 A * | 4/1963 | Ternouth | ......... | G09F 3/20 40/541 |
| 3,512,652 A * | 5/1970 | Armstrong | ......... | A47F 5/005 211/134 |
| 3,889,408 A * | 6/1975 | Offner | ......... | G09F 3/20 40/661.03 |
| 4,295,288 A * | 10/1981 | Westberg | ......... | G09F 3/20 40/651 |
| 4,334,372 A * | 6/1982 | Colmar | ......... | G09F 3/20 40/5 |

(Continued)

Primary Examiner — Jennifer E. Novosad
(74) Attorney, Agent, or Firm — Johnson & Phung LLC

(57) ABSTRACT

A shelf edge display having a shelf gripper and a translucent panel with a light diffusion compartment located between the shelf gripper and the translucent panel to support a light source therein for illuminating a backside of the translucent panel to thereby illuminate an information strip on a front face of the translucent panel with translucent light.

20 Claims, 3 Drawing Sheets

(56) References Cited

U.S. PATENT DOCUMENTS

| | | | | |
|---|---|---|---|---|
| 4,606,141 | A * | 8/1986 | Murray | G09F 3/20 40/518 |
| 4,821,437 | A * | 4/1989 | Abramson | G09F 1/10 40/651 |
| 4,866,868 | A * | 9/1989 | Kass | G09F 3/201 40/661 |
| 5,044,104 | A * | 9/1991 | Hopperdietzel | G09F 3/20 40/649 |
| 5,220,739 | A * | 6/1993 | Chich | G09F 13/04 40/550 |
| 5,263,269 | A * | 11/1993 | Tjarnlund | G09F 3/20 40/5 |
| 5,509,634 | A * | 4/1996 | Gebka | G09F 3/204 24/336 |
| 5,791,080 | A * | 8/1998 | Hamano | G09F 3/204 40/642.02 |
| 5,933,994 | A * | 8/1999 | Misaresh | G09F 23/06 40/649 |
| 6,126,125 | A * | 10/2000 | Dalton | G09F 3/204 248/205.2 |
| 6,367,752 | B1 * | 4/2002 | Forsythe | G09F 3/204 248/220.21 |
| 6,470,613 | B1 * | 10/2002 | Wildrick | G09F 3/20 40/649 |
| 6,481,133 | B1 * | 11/2002 | DeSena | G09F 3/204 40/649 |
| 6,688,567 | B2 * | 2/2004 | Fast | G09F 3/204 211/57.1 |
| 6,793,185 | B2 * | 9/2004 | Joliey | G09F 3/204 211/119.003 |
| 6,935,061 | B2 * | 8/2005 | Thompson | G09F 3/204 40/658 |
| 6,935,062 | B2 * | 8/2005 | Lowry | G03B 21/00 248/205.1 |
| D514,166 | S * | 1/2006 | Brinkman | D20/44 |
| 7,325,348 | B2 * | 2/2008 | Mueller | G09F 3/204 40/649 |
| 7,340,855 | B2 * | 3/2008 | Wiltfang | G09F 3/204 248/220.21 |
| 7,574,822 | B1 * | 8/2009 | Moore | G09F 3/204 40/575 |
| 7,578,088 | B2 * | 8/2009 | Alves | G09F 3/204 211/57.1 |
| D616,035 | S * | 5/2010 | Kosir | D20/44 |
| 7,824,055 | B2 * | 11/2010 | Sherman | A47F 5/0043 362/125 |
| D650,019 | S * | 12/2011 | Stuke | D20/44 |
| D670,765 | S * | 11/2012 | Bruegmann | D20/43 |
| 8,857,087 | B1 * | 10/2014 | Wildrick | G09F 3/16 40/661.03 |
| 9,679,503 | B2 * | 6/2017 | Weyer | A47F 5/0869 |
| 9,697,753 | B2 * | 7/2017 | Johnson | A47F 5/0043 |
| 9,904,001 | B2 * | 2/2018 | Sherman | G02B 6/0065 |
| 10,113,715 | B2 * | 10/2018 | Xue | A47F 3/001 |
| 2003/0019140 | A1 * | 1/2003 | Lowry | G09F 3/20 40/661.03 |
| 2004/0200793 | A1 * | 10/2004 | Hardy | A47F 5/0068 211/119.003 |
| 2005/0035075 | A1 * | 2/2005 | Walker | A47F 5/005 211/119.003 |
| 2005/0076554 | A1 * | 4/2005 | Fast | G09F 3/16 40/661 |
| 2005/0139560 | A1 * | 6/2005 | Whiteside | A47B 57/586 211/119.003 |
| 2007/0251905 | A1 * | 11/2007 | Trotta | A47F 5/0068 211/119.003 |

* cited by examiner

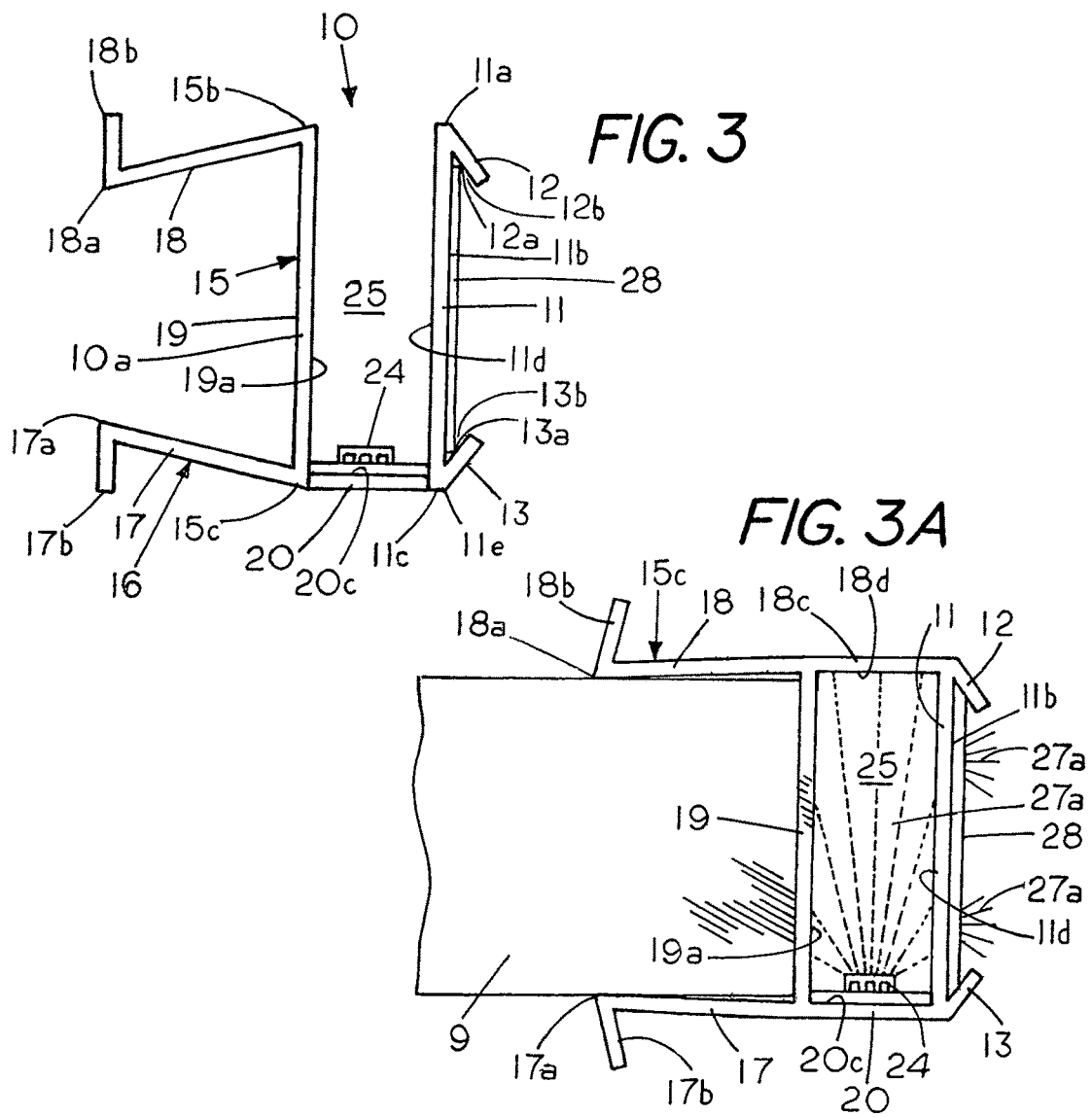
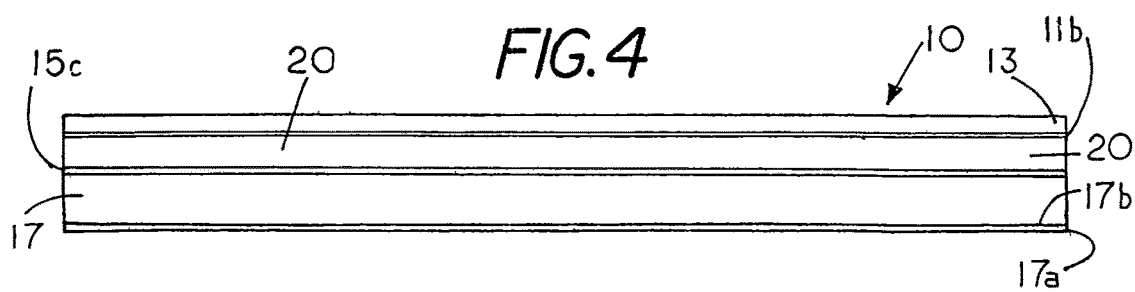
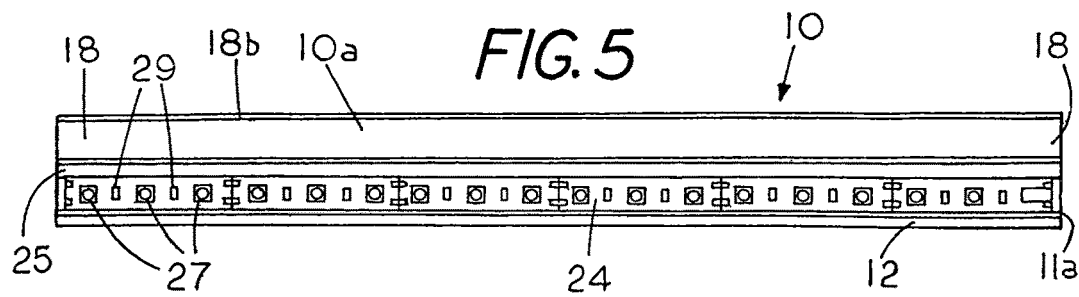

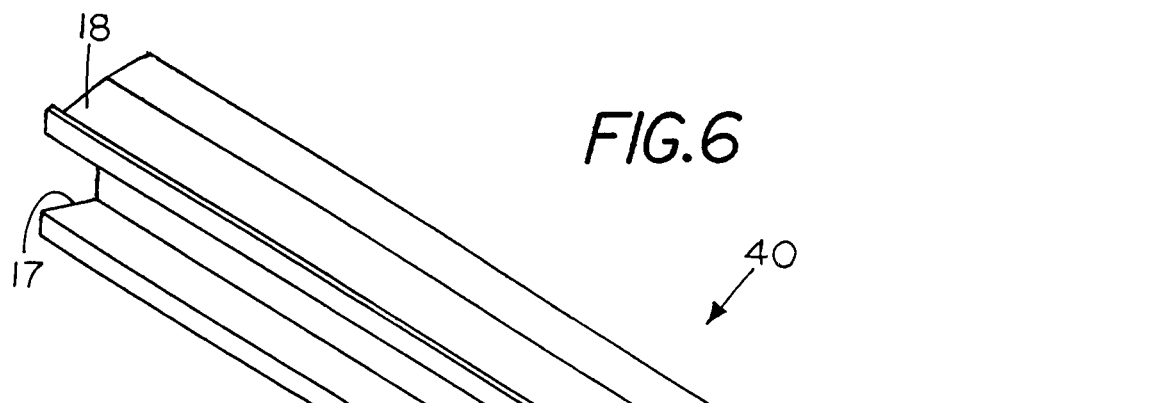
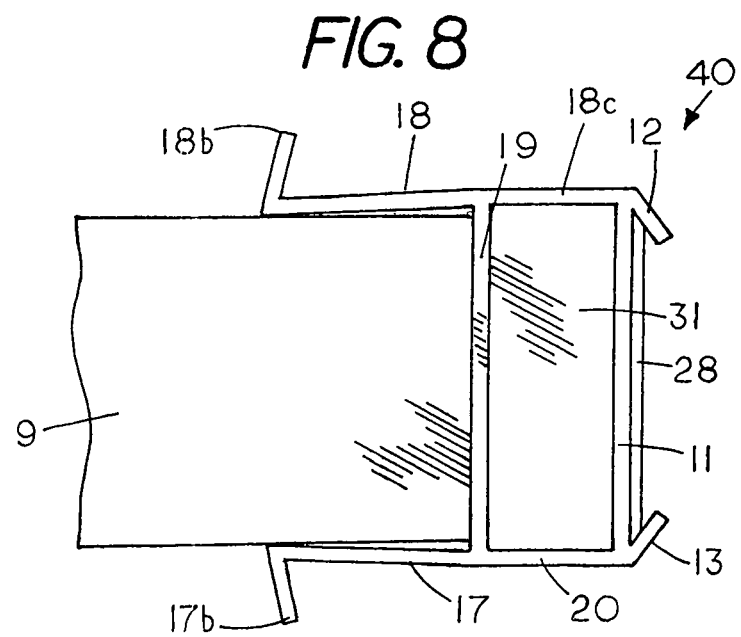

US 10,702,078 B1

SHELF EDGE DISPLAYS

CROSS REFERENCE TO RELATED APPLICATIONS

This application claims priority from U.S. Provisional application 62/613,237 file Jan. 3, 2018.

STATEMENT REGARDING FEDERALLY SPONSORED RESEARCH OR DEVELOPMENT

None

REFERENCE TO A MICROFICHE APPENDIX

None

BACKGROUND OF THE INVENTION

One of the popular ways of displaying consumer information in grocery stores and the like is the placement of a shelf edge display on the outer narrow edge of a shelf. Typically, such shelf edge displays contain a consumer information strip that extends along the edge of the shelf with the consumer information thereon visible to a person located in front of the shelf edge display. In still other types or shelf edge displays opaque advertising strips containing consumer information are removably secured between fixed rails located on the shelf edge. One of the difficulties with shelf edge displays is that they should be large enough to be readable by a person who may be standing a few feet from the shelf edge display even though the width of the shelf may limit the size of the shelf edge display. The shelf edge display should also have a low profile so as not to interfere with the removable or placement of a product on the shelf. In addition, the information on the shelf edge display, while large enough to be readable, must be readable under various light conditions within the store. Another aspect of shelf edge displays is that shelf edge display may become dated so that from time to time the consumer information on the shelf edge display may need to be replaced with different information. For example, the updating of the consumer information may require replacement of an existing consumer information strip with a different consumer information strip. To avoid loss in consumer visibility the replacement should be as noticeable and as readable as the previous consumer information strip and preferable be prominently visible to attract a customer attention without appearing invasive.

SUMMARY OF THE INVENTION

Briefly, the present invention is a user friendly shelf edge display having an internal light diffusion compartment with a translucent front panel having a first end, a second end, a first or front side, a second or backside, and an information display area located on a front face of the panel. Typically, the translucent front panel includes a first panel lip and a second panel lip extending lengthwise along a face of the translucent front with the lips located in a spaced condition from each other to slidably secure an interchangeable back lightable consumer information strip to the information display area on the shelf edge display. The shelf edge display includes an attachment member or shelf gripper extending from the rear of the shelf edge display for engaging a product display shelf to thereby secure the shelf edge display to the product display shelf. The shelf edge display also includes an intermediate member connecting the second side or backside of the translucent front panel to the second side of a panel or wall of the shelf gripper to form an internal light diffusion compartment. Within the light diffusion compartment is a distributed light source that can illuminate information located on a consumer information strip on the translucent front panel through back lighting the consumer information strip with translucent light emanating from the translucent front panel. The light diffusion compartment distributes and diffuses light throughout the light diffusion compartment thereby allowing the distributed light to pass evenly through the translucent front panel and illuminate a consumer information strip located on a front face of the translucent front panel without introducing bright spots on the translucent front panel. When the distributed light source is powered by batteries, which become discharged upon use, one slides the batteries and the distributed light source out an end of the light diffusion compartment and slides a light source with charged batteries into the light diffusion compartment. In addition, the consumer information strip on the face of the shelf edge display can also be easily removed and replaced with a new consumer information strip by merely sliding the old consumer information strip out of the shelf edge display and sliding a new consumer information strip onto the face of the shelf edge display thereby allowing one to quickly change either the batteries or the message to consumers without having to change or otherwise alter other portions of the shelf edge display.

BRIEF DESCRIPTION OF THE DRAWINGS

FIG. 3 is an end view of the shelf edge display of FIG. 1;

FIG. 3A is an end view of the shelf edge display with a closable light diffusion compartment;

FIG. 4 is a bottom view of the shelf edge display of FIG. 1;

FIG. 5 is a top view of the shelf edge display of FIG. 1 with an elongated light source;

FIG. 6 is an isolated perspective view of the shelf edge display showing an end cap for closing the end of a light diffusion compartment located in the shelf edge display;

FIG. 7 is a perspective view of the end cap for closing the end of the light diffusion compartment; and FIG. 8 is an end view of the shelf edge display with an end cap located in the end of the light diffusion compartment.

DESCRIPTION OF THE PREFERRED EMBODIMENT

Figure 1:
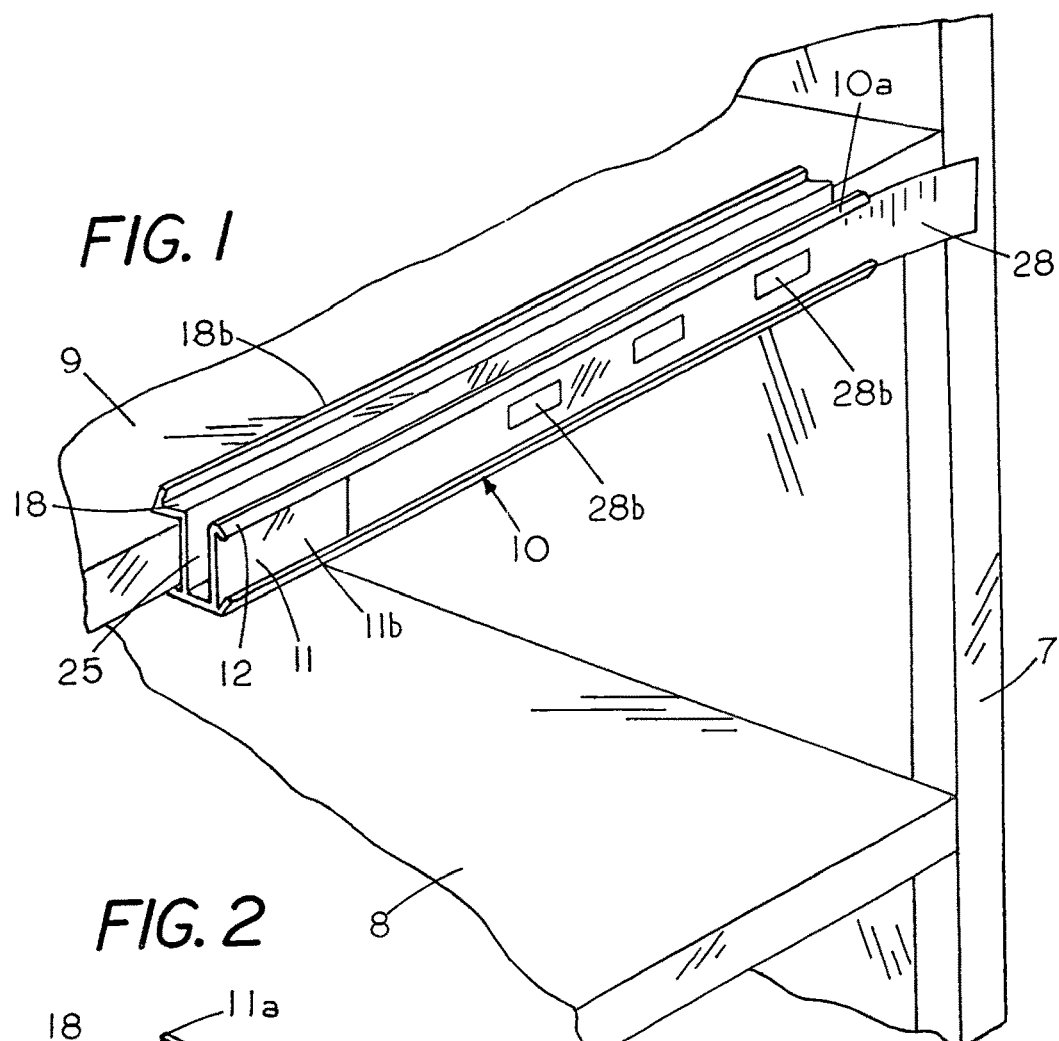
FIG. 1 is a perspective front view of an instore shelf with a shelf edge display frictionally mounted to the shelf.
Figure 2:
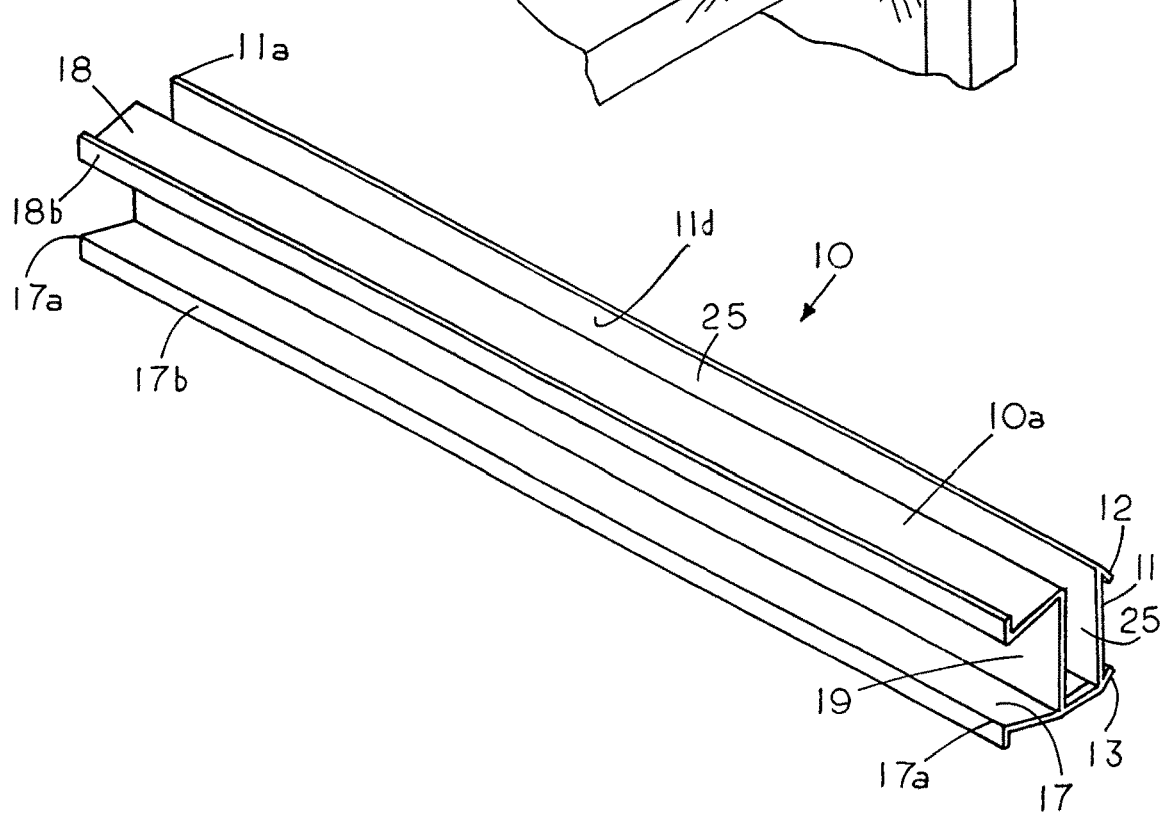
FIG. 2 is an isolated perspective view of the shelf edge display of FIG. 1.

FIG. 1 is a perspective view of an elongated housing 10a comprising a die extruded, one-piece, three-part frictionally mountable and self-illuminable shelf edge display 10 mounted on the edge of a shelf 9 and FIG. 2 shows an isolated view of the self-illuminable shelf edge display 10 while FIG. 3 shows an end view of the shelf edge display 10. Shelf edge display 10 includes a light diffusion compartment 25, with a shelf attachment member 15 located on one side of the light diffusion compartment 25 and a translucent panel, which in this example comprise and elongated translucent panel 11, located on the opposite side of the light diffusion compartment 25. The elongated translucent panel 11 in combination with a light source 24 located therein allows translucent light to pass therethrough to illuminate information on a back lightable semi transparent information display strip 28 to draw consumer attention to products on shelf 9, which supports the shelf edge display 10 thereon. In addition the shelf edge display 10 allows a retailer to quickly change the display strip 28 in response to changing display needs with the slidably and changeably mounted display strip 28.

As shown in FIG. 1 and FIG. 3, a first integral lip 12 extends at an acute angle from a top edge 11a of the elongated translucent panel 11, which forms an elongated information display face 11b, with the first integral lip 12 coacting with the elongated translucent panel 11 to form a first slot 12b located between a front face 11b of the elongated translucent panel 11 and an interior face 12a of the integral lip 12. Similarly, a second integral lip 13 extends at an acute angle from a bottom edge 11c of the elongated translucent panel 11, with the second integral lip 13 extending at an acute angle from the bottom edge 11b of the elongated translucent panel 11 with second integral lip 13 coacting with the elongated translucent panel 11 to form a second slot 13b located between the front face 11b of the elongated translucent panel 11 and an interior face 13a of the second integral lip 13. In this example the slots 12b and 13b are located in a parallel condition so an elongated display strip 28 can be laterally slid therein as shown in FIG. 1. Thus, a feature of the invention is the elongated slot 12b on the top edge of panel 11, and the elongated slot 13b on the bottom edge of panel 11 frictionally supports the replaceable elongated display strip 28 on face 11b. This feature allows one to slidingly remove a display strip 28 and replace the display strip with a different display strip 28 without the aid of any tools. For example, a person wanting to change the information displayed on panel 11 because different goods are being placed on the shelf 9 one merely slides the old display strip 28, which is frictionally held on the face of translucent panel 11 by a top slot 12b formed by top lip 12 and a bottom slot 13b formed by lip 13, out of an open end of slots 12b and 13b. Next, one slides a new display strip into the slots 12b and 13b. Thus, a new display strip with a new message can be quickly positioned on the face 11b of the shelf edge display 10 without a person having to change or alter the shelf edge display 10. Thus, the invention includes a system where the images and or the messages can be changed to respond to demand by a retailer or a manufacturer.

FIG. 1, FIG. 2 and FIG. 3 show an example of a first embodiment of a shelf edge display 10 with an open light diffusion compartment 25 where the light generated from light source 24 can emanate from the open ends and open top of an open light diffusion compartment 25 as well as through the translucent panel 11. In contrast, FIG. 3A and FIG. 6 and FIG. 8 show a second embodiment of a shelf edge display 40 with a closed light diffusion compartment 25. That is FIG. 1, FIG. 2 and FIG. 3 show a shelf edge display 10 with an integral open light diffusion compartment 25 where light can escape through a top opening, and the open ends on the shelf edge display as opposed to the shelf edge display 40 shown in FIG. 3A (note, end cap 31 removed to expose interior of closed light diffusion compartment 25), FIG. 6 and FIG. 8 that contain an integral closed light diffusion compartment 25 obtained through use of a top panel 18c that extends across and along the top of the shelf edge display 10 and end cap 31 on each end of the shelf edge display 40 to form an enclosure around a light source 24 to prevent light from escaping therefrom.

A feature of the invention is that light diffusion compartment 25 minimizes the occurrence of bright spots on the translucent panel 11 through placement of light source 24 directly behind and below a viewing area of the translucent panel 11. In this example, as shown in FIG. 3 and FIG. 3A the light source 24 is located at the bottom of light diffusion compartment 25 with the lights 27 thereon directing light beams 27a upward into chamber 25 as well as laterally and reflectivity into the translucent panel 11. Thus, the introducing of bright spots on the face 11b of the caused by point sources of multiple individual lights is minimized through the positioning of the light source 24 so as not to direct light directly into the backside 11d of the translucent panel 11 thereby ensuring that when an information strip is located on a front face 11b of translucent panel 11 it can be uniformly illuminated.

In the closed light diffusion compartment 25 the light generated by the light source 24 is directed through the front translucent panel 11 while in the open light diffusion compartment a portion of the light escapes from the top or sides of the open light diffusion compartment 25, a feature useful in some applications. Either embodiment may be used without departing from the spirit of the invention. In the shelf edge display 10 and shelf edge display 40 like parts are identified with like numbers.

FIG. 7 shows an example of an end cap 31 useable with the invention to prevent light from emanating from an open end of the shelf edge display 40 of FIG. 8 thereby creating a closed light diffusion compartment 25. In this example, end cap 31 includes a top lip 32 and a bottom lip 33 for frictionally engaging a top link or top panel 18c and the bottom panel 20 of the light diffusion compartment 25 to thereby close the open end on the shelf edge display and prevent light from escaping therepast. An identical end cap 31 may be used to close the opposite end of shelf edge display 40. A feature of the shelf edge display 40 of FIG. 6 and FIG. 8 is that end cap 31 can be removed (see FIG. 3A) to allow one to replace the light source 24, which in the example shown in FIG. 5 comprise a strip of individual LED lights 27 and a set of batteries 29 for powering the LED lights. In this example light source 24 containing an elongated strip of lights is located in a side-by-side relationship as well as coextensive with the translucent panel 11 thereby ensuring that the light therefrom can be uniformly distribute along the length of the translucent panel 11. In addition, each of the individual lights 27 in the light source 24 are first directed vertically upward into the light diffusion chamber 25 (see FIG. 3A) rather than directly onto the vertical translucent panel 11 thereby minimizing the opportunities for bright spots to appear on the exterior face 11b due to point sources of light. While a plurality of batteries 29 and a plurality of LED lights 27 are shown located along the power source 24 in some instance a single battery may be preferred as the power source or a single light may be preferred as the light source. In other embodiments the light source 24, which may or may not be LED lights, can be connected to an instore AC power source rather than a battery. Although a set of individual lights 27 are shown in light source 24 the individual lights 27 are coextensive with the translucent panel 11.

Alternately, one may want to use a single elongated light source that is coextensive with the translucent panel 11.

If a battery 29 is included to power the light source 24 in the shelf edge display 40 the end cap 31 can be removed to allow one to slide light source 24 with discharged batteries 29 out of the light diffusion compartment 25 and slide a light source with a fresh batteries 29 into the light diffusion compartment 25. The end cap 31 can then be replaced to again form a closed light diffusion compartment 25 where the light emanates through the translucent panel 11. On the other hand, with an open light diffusion chamber 25 the batteries 29 and or the light source 24 can be quickly replaced since there is no end cap to remove. Light source 24 contains an integral switch or an on/off timer (not shown) to control the duration that the light source is in the on condition.

Thus a feature of the invention is that one can easily and quickly replace spent batteries by sliding the light source 24 with spent batteries 29 out the end of the shelf edge display 10 or shelf edge display 40. While an elongated strip 24 is shown that contains both batteries 29 and LED lights 27, which extend therealong, in some instance one may use a separate light source and a separate battery. With the above described system with a separate battery and separate LED light strip only the battery need be periodically replaced, which is a departure from prior art static non illuminated shelf edge displays.

A feature of the invention shown herein is that it allows one to use a translucent panel 11 and an at least a partially transparent information strip 28 with the translucent panel 11 having a light transmission range or degree of translucency that extends anywhere from transparent to nearly opaque. With the avoidance of bright spots on the translucent panel 11 the invention provides for an enhanced ability to mate the transparency of information strip 28 to the translucency of the translucent panel 11 through on-the-go varying of the intensity of the power source 24. Thus, one can change the visual appearance of an image 28b on strip 28 by changing the intensity of the light source 24.

FIG. 3 shows an end view of shelf edge display 10 revealing the shell gripper 16 located on the backside of light diffusion compartment 25 with a wall or panel 19 of the shelf gripper 16 having a back face 19a that forms a backside of light diffusion compartment 25. Preferably back face 19a is opaque so as to prevent light generated within the light diffusion compartment 25 from escaping through wall 19. On the other hand the translucent panel 11, which forms a front portion of the light diffusion compartment 25 allows light to pass through translucent panel 11. An integral connecting 20, which includes a bottom face or carrying ledge 20c of light diffusion chamber 25 has one end that connects to one edge of shelf gripper 15 and the opposite end that connects to the translucent panel 11 with carrying ledge 20c supporting the light source 24 thereon as shown in FIG. 3 and FIG. 3A. In the embodiment of FIG. 3A panel 18c has an interior face 18d that forms a top surface of the closed light diffusion compartment 25. While faces 18d, 20c and 19a are opaque to prevent light from escaping from the light diffusion chamber 25 a feature of the invention is that one or all of the faces 18d, 20c and 19a may be reflective surfaces thereby reducing the amount of light needed to illuminate a message on the translucent panel 11. A feature of light source 24 is that it rests on carrying ledge 20c without having to be secured to the shelf edge display 10 thus enabling one to slidingly remove and change the light source 24 while the shelf edge display remains mounted on shelf 9.

The end view shown in FIG. 3 reveals a feature of the unique structure of the shelf edge display 10 that enhances the ability to manufacture the display shelf edge, namely that the elongated shelf edge display 10 is well suited to be extruded through a die, The feature of extrudeability of the shelf edge display 10 not only makes it economical to manufacture it also provides a clean shape that can blend with a product shelf. A further feature of the invention is that both translucent material and non translucent material can be extruded and fused to form a one-piece shelf display edge 10 that includes a translucent front panel 11 with the remaining portion of the shelf display edge formed from opaque materials.

The shelf gripper 15 shown in FIG. 3 and FIG. 3A is frictionally mountable to a flat store shelf 9 through a first elongated resilient wing 17 that integrally attaches to edge 18a of back wall 19 and a second elongated resilient wing 18 that integrally attaches to edge 15b of back wall 19. Back shell gripper wall 19 forming a backside of the light diffusion compartment 25 and the translucent panel 11 forming a front side of the light diffusion compartment 25 with both the shelf gripper 15 and the translucent panel 11 formable through a continuous die extruded process.

FIG. 3 shows the first elongated resilient extending wing 18 extends rearward and cantileverly away from back wall 19 of the elongated resilient connector 15. Similarly, a second resilient cantileverly extending wing 18 extends rearward and cantileverly away from back wall 19 of the elongated resilient connector 15. In this example, the first resilient cantilevered wing 17 and the second resilient cantilevered wing 18 are hand spreadable to enable a person without the aid of tools to bring the first jaw 18a and wing 18 as well as the second jaw 17a and wing 17 into a frictional shelf gripping position as shown in FIG. 3A through the resiliency of the material as well as the shape of wing 17 and wing 18. That is, the thickness of the wall 19 and the wings of the shelf gripper 16 are selected so hand pressure of a few pounds can flex apart wing 17 and wing 18. In the example shown the extruded parts are shown of the same thickness, however, the walls and wing 17 and wing 18 may be formed of different thickness without departing from the spirit and scope of the invention. In this example both wing 17 and wing 18 have a identical shape and obtain their ability to be spread apart through their length in relation to thickness which provides a lever to bend or flex apart wing 17 and wing 18 so that wing 17 and wing 18 can be inserted onto a shelf edge 9 as shown in FIG. 3A. In addition, lip 18b provides a stiffness to the end of wing 18 and lip 17b provides stiffness to the end of wing 17, which assists in maintaining wing 17 and wing 18 in the clamping position on shelf 9 shown in FIG. 3A.

Although the embodiment of FIGS. 1, 2, and 3 show a translucent panel 11 and an at least partially translucent or transparent information strip 28, an alternative embodiment of the lighted shelf edge display 10 may have a translucent panel 11 whether the translucency ranges anywhere from transparent to partially opaque. In either case the transparency of the information strip 28 can be mated to the translucency of translucent panel 11 as well as the strength of the light source 24. Once the translucency of the translucent panel 11 and the transparency of the strip 27 are mated the strength of the light source 24 can be changed to change appearance of an image on the information strip 28 and thereby change the emphasis or the image by merely changing the strength of the light source 24. For example, at one strength certain information would be highlighted but at a different strength other information would be highlighted. Thus, a feature of the invention is that a viewable image on information strip 28 can be changed even though the actual image on information strip 28 has not changed.

It is noted that instead of the use of information display strip 28 for displaying of information on the display areas, alternative embodiment of the shelf edge display of the present invention may be used where the translucent panel 11 comprises an erasable medium which can be changed or erased thus allowing one to eliminate the need for a separate information strip.

While it is preferred to extrude the shelf edge display as a finished unit as shown in FIG. 1 or FIG. 2 it is envisioned that the various panels in the shelf edge display may be separately formed and later assembled thereto with the shelf gripper 16 composed of a variety of material including for example a non-translucent material such as aluminum or other polymer plastics. If extruded in one piece the shelf edge display may be composed for example of a polymer plastic such as Acrylonitrile Butadiene Styrene.

Although the attachment member 16 shown comprises a shelf gripper 16 with two jaws various types fasteners including but not limited to clips, hooks, adhesives, and nails for securing the shelf edge display to the product display shelf. The embodiment shown in the drawings shows the attachment member or shelf gripper 16 as comprising a flexible resilient upper wing 18 and a lower wing 17 for engaging opposing shelf surfaces. In addition, to enhance gripping one or both of jaw 17*a* and jaw 18*a* may include a set of teeth for engaging surfaces of the product display shelf to more tightly secure the shelf edge display 10 to the product display shelf.

As described herein the shelf edge display is reusable, hand attachable and hand detachable shelf edge display with an updatable display strip that inexperienced personal can readily mount to a shelf edge. The shelf edge display 10 indirectly illuminating a translucent panel 11 to backlight information on front of the translucent panel 11 with the translucent panel forming a front face 11*d* of the light diffusion compartment 25 and the shelf gripper 15 forming a back face 19 of the light diffusion compartment 25 with the back face having a reflective surface thereon to enable the translucent panel 11 to be illuminated through indirect light from the light source 24, which may be an elongated strip having lights 29 thereon.

I claim:

1. An updatable one-piece frictionally mountable and self-illuminable shelf edge display comprising:
    an elongated housing including:
    a translucent panel allowing light and not allowing detailed images to pass therethrough with the translucent panel having a first integral lip extending at an acute angle from a top edge of the translucent panel, said first integral lip coacting with the translucent panel to form a first slot located between a front face of the translucent panel and an interior face of the first integral lip and a second integral lip extending at an acute angle from a bottom edge of the translucent panel, said second integral lip coacting with the translucent panel to form a second slot located between the front face of the translucent panel and an interior face of the second integral lip;
    a shelf gripper frictionally mountable to a store shelf including an elongated resilient connector having a back panel with a top edge and a bottom edge with a first resilient cantileverly extending wing with a first jaw extending from the top edge of the elongated resilient connector and a second resilient cantileverly extending wing with a second jaw extending from a bottom edge of the elongated resilient connector with the first resilient cantileverly extending wing and the second resilient cantileverly wing spreadable apart for bringing the first jaw and the second jaw into a frictional shelf gripping position through a resiliency of the first wing and a resiliency of the second wing;
    an integral connecting link having a first edge cantileverly and integrally attached to a backside of the translucent panel and a second opposite edge cantileverly and integrally attached to the back panel of the shelf gripper to thereby form an internal light diffusion compartment located within said elongated housing;
    a light source comprised of a plurality of lights located in said internal light diffusion compartment with said light source supported by and extending along a carrying ledge of the integral connecting link, said light source located directly behind and below a viewing area of the translucent panel so as not to direct light directly into the backside of the translucent panel, said light source directing light along and through the backside of the translucent panel to thereby uniformly illuminate a front face of the translucent panel without introducing a bright spot on the front face of the panel; and
    a back lightable semi transparent information display strip slidably and changeably located in the first slot and the second slot with a translucent light emanating from the front face of the translucent panel illuminates the back lightable semi transparent information display strip so that an information contained on the back lightable semi transparent information display strip is viewable by a person located in front of the shelf edge display.

2. The shelf edge display of claim 1 including a top panel extending between the shelf gripper and a top end of translucent panel and an end cap on each end of the elongated housing to form the internal light diffusion compartment into a closed light diffusion compartment in the elongated housing.

3. The shelf edge display of claim 1 wherein the shelf gripper comprises a non-translucent material.

4. The shelf edge display of claim 1 wherein the translucent panel comprises Acrylonitrile Butadiene Styrene.

5. The shelf edge display of claim 1 wherein the light source includes a strip of LED lights extending along the internal light diffusion compartment with the strip of LED lights directing a light beam along and not directly into the translucent panel.

6. The shelf edge display of claim 1 wherein the light source includes an on/off timer.

7. The shelf edge display of claim 1 wherein the internal light diffusion compartment includes a battery for powering the light source with the battery slidably removable through an end of the shelf edge display to allow removable and replacement of the battery with a fresh battery.

8. The shelf edge display of claim 1 wherein the light source is located at a bottom of the internal light diffusion compartment with the light source projecting light along and laterally into the translucent panel to deliver translucent light from a face of the translucent panel.

9. The shelf edge display of claim 1 wherein the internal light diffusion compartment has a U-shape with an open top extending lengthwise along the shelf edge for light to emanate therefrom.

10. The shelf edge display of claim 1 wherein the internal light diffusion compartment has a closed top with a first end and a second end of the elongated housing each having an end cap therein.

11. A reusable, hand attachable and hand detachable shelf edge display comprising:
    an elongated housing;
    a shelf gripper located on one side of said elongated housing;
    a back lightable translucent panel located on an opposite side of said elongated housing;
    a carrying ledge connecting said shelf gripper to the back lightable translucent panel with said carrying ledge located between said shelf gripper and said back lightable translucent panel with a face of said back lightable translucent panel, a face of the shelf gripper and a face of the carrying ledge forming a light diffusion compartment; and a light source located in said light diffusion compartment with the light source located below a portion of the translucent panel for directing light onto a backside of said translucent panel without having said light source pointed at a backside of the translucent panel.

12. The reusable, hand attachable and hand detachable shelf edge display of claim 11 wherein the light diffusion compartment is a closed light diffusion compartment.

13. The reusable, hand attachable and hand detachable shelf edge display of claim 11 wherein the shelf gripper and the translucent panel comprise a continuous member.

14. The reusable, hand attachable and hand detachable shelf edge display of claim 11 wherein the shelf gripper includes a first wing cantileverly and resiliently extending outward from a top end of the shelf gripper and a second wing cantileverly and resiliently extending outward from a bottom end of the shelf gripper with the first wing frictionally engageable with a top shelf surface and the second wing frictionally engageable with a bottom shelf surface to thereby support the hand detachable shelf display on the top shelf surface and the bottom shelf surface.

15. A shelf edge display comprising:
a translucent front panel having a first side and a second side with an information display area located on the first side of the front panel;
a first panel lip and a second panel lip extending from the first side of the front panel, said first panel lip spaced from said second panel lip with said second panel lip coacting with said first panel lip to slidably secure an information strip to the information display area;
an attachment member for engagement with a shelf to thereby support said shelf edge display thereon;
a link connecting said translucent panel to said attachment member with said link, said attachment member and said translucent panel forming a light diffusion compartment between said translucent panel and said attachment member;
a carrying ledge located below a viewing area of the translucent front panel; and
a light source located in said light diffusion compartment for directing light along and not directly into the backside of the translucent front panel.

16. The shelf edge display of claim 15 wherein the attachment member includes a first flexible resilient wing engageable with a one side of a shelf and a second flexible resilient wing engageable with an opposite side of the shelf to secure said shelf edge display thereto; and
the light source comprises a strip of LED lights supported on the link within said light diffusion compartment.

17. The shelf edge display of claim 15 wherein said light diffusion compartment is a closed light diffusion compartment.

18. The shelf edge display of claim 15 wherein the translucent panel is coextensive with the light source in said light diffusion compartment and the diffusion compartment contains reflective walls therein deflecting light toward the translucent panel.

19. The shelf edge display of claim 15 including an information strip located on an exterior face of said translucent panel.

20. The shelf edge display of claim 15 wherein the translucent panel forms a front face of the light diffusion compartment with a back face of the light diffusion compartment having a reflective surface with the translucent panel illuminated through indirect light from the light source.

\* \* \* \* \*